United States Patent [19]

Englin

[11] 4,220,743

[45] Sep. 2, 1980

[54] PROCESS FOR AQUEOUS DISPERSION POLYMERIZATION OF VINYL HALIDE MONOMERS IN COATED REACTOR

[75] Inventor: Boris Englin, Chadstone, Australia

[73] Assignee: ICI Australia Limited, Melbourne, Australia

[21] Appl. No.: 882,926

[22] Filed: Mar. 2, 1978

[30] Foreign Application Priority Data

Mar. 8, 1977 [AU] Australia .............................. 9324/77

[51] Int. Cl.$^2$ .............................................. C08F 2/20
[52] U.S. Cl. .................................... 526/62; 422/131;
422/135; 427/239; 528/211; 528/229
[58] Field of Search .................. 526/62; 528/211, 229;
422/135, 131

[56] References Cited

U.S. PATENT DOCUMENTS

| | | | |
|---|---|---|---|
| 1,955,731 | 4/1934 | Bender | 528/211 |
| 3,440,196 | 4/1969 | Boldebuck et al. | 260/29.2 |
| 3,669,946 | 6/1972 | Koyanagi et al. | 526/62 |
| 3,778,423 | 12/1973 | Reiter | 526/62 |
| 4,024,301 | 5/1977 | Witenhafer et al. | 526/62 |
| 4,024,330 | 5/1977 | Morningstar et al. | 526/62 |

Primary Examiner—Stanford M. Levin
Attorney, Agent, or Firm—Cushman, Darby & Cushman

[57] ABSTRACT

A process for polymerization of vinyl halide monomers in reactors with interior walls treated with a coating composition to prevent buildup said coating composition comprising a mixture of at least one compound chosen from the group consisting of monomeric aliphatic and aromatic amines, and at least one compound chosen from the group consisting of oxy-group substituted aromatic compounds and quinone type compounds. One embodiment is directed towards low temperature formation of the coating product in the presence of oxygen and on the reactor surface. Another embodiment concerns preforming the coating product and then applying it to the reactor surfaces.

19 Claims, No Drawings

PROCESS FOR AQUEOUS DISPERSION POLYMERIZATION OF VINYL HALIDE MONOMERS IN COATED REACTOR

The present invention relates to a process for the polymerization of vinyl halide monomers such as vinyl chloride in aqueous dispersion and to a reactor wherein such a polymerization process may be carried out.

By polymerization in aqueous dispersion is meant polymerization in aqueous emulsion or aqueous suspension (including aqueous microsuspension), optionally in the presence of colloids such as polyvinyl alcohol and/or surfactants.

When the reaction is carried out in the usual manner it is well known that a problem arises in that the surfaces inside the reactor become coated with tenaciously adhering polymeric material known as build-up. The formation of tenaciously adhering build-up is undesirable from the point of view of achieving efficient heat transfer for cooling and heating the reactor contents, effective usage of monomer, effective control and monitoring of the polymerization reaction, and acceptable polymer quality (in view of contamination by dislodged particles of the build-up).

This deposit, which varies in thickness, hardness and degree of adhesion to the metal is composed of polymer in several different physical forms. The main type, particularly from the standpoint of routine cleaning, is a hard film over the whole surface of the reactor. The thickness of this film varies from batch to batch but is normally a few thousandths of an inch thick. The other types are hard or soft lumps which accumulate locally in the reactor or powder which is more generally distributed. The soft lumps are composed of material that has escaped the washing out process and are comparatively easy to remove. The hard lumps are believed to originate as soft material that has been allowed to stay in the reactor for more than one batch or simply by polymerization of vinyl chloride in an area of very high or very low agitation, i.e. an area where the normal droplet protection of the granulating agent is ineffective. They are normally found in roof ports, on staging brackets, on the impeller, or indeed any area where there is a severe discontinuity to the surface in the reactor. They are very difficult to remove, normally requiring a hammer and chisel. A somewhat similar type of build-up can be formed, when a reactor is inadequately cleaned, by growth on to skin build-up remaining. This type of build-up along with lumps from impellers, etc., can detach itself from the reactor wall during a batch and has to be removed manually from the reactor at frequent intervals, otherwise blockage of the valve or slurry transfer lines will result. It is known that the amount of build-up produced is much larger if the reactor is inadequately cleaned. Powder type build-up is often quite firmly attached to the surface and is at its thickest at or above the liquid level in the reactor where it has been deposited by splashing.

Because of the problems in respect of heat transfer, polymerization control and polymer quality, it is necessary to clean the reactor between each polymerization cycle wherein the deposited material is removed as completely as possible, e.g. by scraping by hand, solvent cleaning or pressure-washing. This is wasteful in terms of the expense of the equipment and manpower required to carry out such cleaning and also in terms of the loss of productivity for a given reactor arising from the time taken to effect the cleaning operation.

This formation of build-up, which increases with polymerization time, is also a major difficulty in the development of a trouble-free continuous process for the aqueous dispersion polymerization of vinyl halide monomers such as vinyl chloride.

We have now discovered a process whereby vinyl halide monomers such as vinyl chloride may be polymerized in aqueous dispersion without any or with very much reduced formation of build-up.

According to the present invention there is provided a process for the polymerization of vinyl halide monomers in aqueous dispersion wherein polymerization is carried out in a reactor having deposited on interior surfaces thereof a coating composition, said coating composition comprising the product of the reaction of at least one compound chosen from the group (A) consisting of monomeric amines, with at least one compound chosen from the group (B) consisting of oxy-group substituted aromatic compounds and quinone type compounds.

The reaction is carried out at a temperature below 110° C., and no catalyst is required. A temperature at or just above ambient may conveniently be employed.

By monomeric amines we mean aliphatic amines, such as monoalkylamines and dialkylamines and compounds structurally derived therefrom, and primary and secondary aromatic amines and compounds structurally derived therefrom. Typical amines suitable for use in the process of this invention are p-aminobenzoic acid, p-toluidine, tri-ethanolamine, tributylamine, phenothiazine and diphenyl-amine. Preferably the amine contains at least two amino groups per molecule ie, polyamino monomeric amines. Preferred polyamino monomeric aliphatic amines are triethylenetetramine and tetraethylenepentamine.

Typical compounds (B) are hydroquinone, benzoquinones and substituted benzoquinones, pyrogallol, phenol and para and meta substituted phenols, cresols, p-tertiary-butylcatechol, picric acid and resorcinol. Preferred compounds (B) are pyrogallol and hydroquinone.

We have found particularly good results may be obtained when two or more compounds are chosen from one or other or both of groups (A) and (B).

In another aspect of our invention at least two compounds are chosen from group (A) such that at least one compound is an aromatic amine and at least one compound is an aliphatic amine, for example p-phenylene diamine and tetraethylpentamine.

Any one compound of groups (A) or (B) when used alone is far less efficient than the reaction products of our invention in protecting the reactor surfaces from build-up and the use of such individual compounds may retard or even inhibit the desired polymerization. Furthermore the individual compounds are significantly soluble in the emulsions or suspensions in the reactor and hence are rapidly removed from the walls and surfaces of the reactor.

The ratio of the weight of each compound to the total weight of the compounds selected from (A) and (B) is in the range from 1:100 to 3:4.

It is a feature of our invention that a major proportion of the coating composition remains on the internal surfaces and walls of the reactor and prevents or inhibits the development of build-up. Some compositions can provide a coating efficient for a series of polymerization without the need to recoat such surfaces prior to each polymerisation.

There is also provided according to the invention a polymerization reactor having internal surfaces which have been coated with a coating composition as herein before defined.

There is further provided according to the invention coating compositions as hereinafter defined.

The reaction product of our invention is usually prepared by reacting the selected compounds from groups (A) and (B) in a solvent or mixture of solvents. The choice of the solvent or solvents is not narrowly critical. For example, the solvent may be an alcohol such as methanol, ethanol, isopropyl alcohol and cetyl alcohol, a ketone such as acetone, aromatic hydrocarbons such as toluene, benzene, and xylene, an ester such as ethyl acetate, butyl acetate and dioctyl phthalate, or the combination of any two or more of these may be used. It is also possible to carry out the reaction in the absence of added solvent.

The reaction proceeds rapidly at ambient temperatures, the solution becomes coloured, and typically the reaction product precipitates. The coating product is then applied to the internal surfaces of the reactor as a dispersion or solution in a liquid carrier medium which must be allowed or caused, eg by heating and/or evacuating or blowing air through the reactor, to evaporate so as to leave an adherent coating. Where heating is used a temperature is kept below 110° C. The liquid carrier medium may be chosen from the solvents hereinbefore described.

The solution or dispersion of the coating product may be applied to the surfaces by any convenient means, for example, by spraying, painting, dipping or flooding.

In a preferred embodiment of our invention two solutions are prepared, one containing the compounds of group (A) the other containing the compounds of group (B). The two solutions are sprayed simultaneously onto the warmed interior surfaces of the polymerization reactor so that mixing occurs at the area where the two jets meet the surface. Reaction between the compounds of the two groups then proceeds rapidly to form a tightly adhering layer of the coating composition.

In yet another preferred embodiment of our invention the reaction product is prepared under alkaline conditions. While such conditions will be achieved if the amine or amines are present in sufficient quantity, we prefer to employ an added quantity of an inorganic alkali, such as an alkali metal carbonate or an alkali metal or ammonium hydroxide, particularly sodium or potassium hydroxide. The addition of such an inorganic alkali may be before, during or after the mixing of the compounds selected from groups (A) and (B).

The preparation of the coating product is preferably effected in the presence of oxygen. This is conveniently supplied by exposing the constituents from which the product is derived to the surrounding air, such exposure may be during or after reaction, as for example in the embodiment where the coating product is prepared by simultaneous spraying of separate solutions or dispersions of the group (A) and group (B) compounds. Oxygen may also be supplied by blowing or injecting oxygen or air during the preparation of the coating product. When a quinone or quinone type compound is present as a group (B) compound, this may serve as an oxidising agent.

The coating composition may be applied to any surface inside the reactor which is liable to suffer the formation of build-up. For example, it may be applied to the interior surface of the main body of the reactor, the interior surface of the roof of the reactor (which is often above the liquid level of the polymerization and usually suffers tenacious build-up), the surfaces of the stirrer system (stirrer shaft, paddle) and the surfaces of projections or protuberances inside the reactor such as baffles and thermocouple pocket covers. It may be pointed out that the coating compositions used according to the invention are exceptionally effective in preventing build-up above the liquid level of the polymerization medium in the reactor.

If a condenser is installed in a part of the polymerization vessel that is in contact with the gaseous phase or if it is installed outside the vessel and connected to the polymerization vessel, the condenser as well as the conduit pipe connecting the condenser and the polymerization vessel had best be similarly treated.

The composition is preferably deposited onto the surfaces very thinly. It can be deposited as is, or dissolved in some solvent or diluted with a diluent. What is recommended is that it be deposited at a rate of at least 0.1 g/m². If the amount of the coating deposited is less than 0.001 g/m², the effect of the treatment will not last long, but there is no upper limit to the thickness of the coating, so long as it has no adverse effect on the properties of the polyvinyl halide prepared. Therefore the composition may be deposited at a rate of for instance, 1 g/m² or more.

In order to fix certain compositions of our invention onto the surface of the vessel walls, various fixing agents may be added to them. Such fixing agents are exemplified by natural and synthetic polymers such as glue, gelatin, cellulose derivatives, polyvinyl alcohol and polyacrylic acid, polystyrene; thermosetting substances such as shellac resins, phenol resins, alkyd resins, epoxy resins, urethane resins, and tung oil.

Although the invention has been described with reference hereinbefore to the polymerization of vinyl chloride, it is also applicable to vinyl halide monomers in general.

By "vinyl halide monomers" is meant those monomers polymerisable by free-radical polymerization which are olefinically unsaturated in the alpha position and substituted by at least one halogen atom. These monomers are preferably selected from substituted derivatives of ethylene and contain only two carbon atoms. Examples of such monomers include vinyl chloride, vinyl bromide, vinyl fluoride, vinylidene chloride, vinylidene fluoride, chlorotrifluoroethylene and tetrafluoroethylene. The invention is preferably applied to the polymerization of fluorine- or chlorine-containing vinyl monomers, especially vinyl chloride.

By "polymerization" is meant both the homopolymerization of the vinyl halide monomers and the copolymerization with each other or with other comonomers copolymerizable therewith. Examples of the latter include vinyl ethers such as vinyl acetate, acrylic esters such as methyl acrylate and butyl methacrylate, acrylic nitriles such as acrylonitrile and methacrylonitrile, unsaturated diesters such as diethyl maleate, allyl esters such as allyl acetate, α-olefines such as ethylene and propylene, vinyl ethers and styrene compounds.

However, we prefer to apply the invention to the production of polymers containing at least 50% molar, and more particularly at least 80% molar, of units derived from vinyl halide monomers, particularly vinyl chloride.

The process according to the invention may be employed in any polymerization technique where the monomer(s) is dispersed in the form of droplets in a liquid aqueous phase. For example it may be used for polymerization in aqueous emulsion in which case any suitable emulsifying agent can be used, and in particular where an ionic emulsifying agent such as sodium lauryl sulphonate or sodium dodecyl benzene sulphonate and non-ionic emulsifying agents may be used.

The process of the invention is also most applicable to polymerization in aqueous suspension and microsuspension.

Any suitable dispersing agent may be used for polymerization in aqueous suspension, and particularly finely dispersed solids, gelatin, polyvinyl acetates of various degrees of hydrolysis, water-soluble cellulosic ethers and polyvinyl pyrrolidones. These dispersing agents can be used together with surface-active agents if desired. The amount employed may vary widely and is generally between 0.05 and 1.5% by weight calculated on the amount of water used.

Any suitable free-radical polymerization initiator that is monomer-soluble may be used for polymerization in aqueous suspension. Examples of these include peroxy compounds such as di-tertiary-butyl peroxide, lauroyl peroxide and acetyl cyclohexyl sulphonyl peroxide, azo compounds such as azo-bis-isobutyronitrile and 2,2'-azo-bis-2,4-dimethylvaleronitrile and boron alkyls. Monomer-soluble free-radical polymerization initiators that are particularly suitable for use in the process according to the invention are the dialkyl peroxydicarbonates whose alkyl radicals contain up to 20 carbon atoms, such as diethyl peroxydicarbonate, diisopropyl peroxydicarbonate and di(tertiarybutyl-cyclohexyl)-peroxydicarbonate, and 2,2'-azo-bis-2,4-dimethylvaleronitrile and azo-bis-isobutyronitrile. These initiators may be used in conventional quantities—generally speaking from 0.01 to 1% by weight calculated on monomer.

Polymerization is homogenised aqueous dispersion, sometimes known as polymerization in microsuspension, comprises mechanically homogenising an aqueous dispersion of the monomer or monomers in the presence of a surface-active agent (for example by subjecting it to a violent shearing action), and polymerizing the homogenised dispersion in the presence of an initiator that is monomer soluble.

Conventional emulsifying agents and monomer-soluble initiators can be used for polymerization in microsuspension such as for example an ionic emulsifying agent like sodium dodecylbenzenesulphonate, and peroxide initiators of the dialkanoyl peroxide type, e.g. lauroyl peroxide.

In addition to the emulsifying or dispersing agents and initiators, the aqueous dispersions (i.e. suspensions, microsuspensions and emulsions) may contain one or more additives that are normally employed in conventional processes for polymerization in aqueous dispersion. Examples of such additives include particle size regulators, molecular weight regulators, stabilizers, plasticizers, colouring agents, reinforcing agents and processing aids.

The polymerisation medium may also contain one or more substances which themselves inhibit polymerization build-up.

The operating conditions for polymerization according to the process of the present invention may be those customarily used. For example, in the case of vinyl chloride polymerization, the temperature is generally between 40° and 75° C. and the pressure generally below 15 kg/cm$^2$.

Our invention is illustrated by, but by no means limited to, the following examples. Unless otherwise specified all parts and percentages are by weight.

EXAMPLE 1

This comparative example describes a conventional process used as a control to compare with the improved process of the invention. A reactor in the form of a stainless steel pressure vessel of 7 liters nominal capacity equipped with heating and cooling means was charged with 3500 ml of demineralized water, 2.4 g of a peroxydicarbonate catalyst and 1.75 g polyvinyl alcohol (partially hydrolysed polyvinyl acetate). The contents of the vessel were stirred and air was removed by evacuation. 3000 g of vinyl chloride monomer was added to the evacuated vessel and the contents were heated to 56° C. The temperature was maintained until pressure drop indicated the end of the reaction of polymerization.

The residual gas was vented off, the slurry of polyvinyl chloride in water was dropped down through a bottom valve. The lid was opened and the remaining loose polymer was rinsed with water and the firm deposition of the polymer inside the vessel was examined.

There was a deposit of polymer firmly attached to the wall, to the stirrer shaft and to the thermometer well. The build-up was particularly prominent at the liquid-gas boundary.

To remove the deposit use of a scraper was necessary. The deposit on the stirrer shaft and on the stirrer blades was particularly hard to dislodge and it was necessary to use a chisel with a gentle blow of a hammer to chip off particularly hard portions of the build-up.

The total weight of the deposit constituted 0.6% of the vinyl chloride monomer charged to the pressure vessel.

EXAMPLE 2

The reactor from Example 1 was thoroughly cleaned and polymerization of vinyl chloride was again carried out as described in Example 1 except that prior to charging the reactants to the reactor all the internal surfaces, having been cleaned of build-up, were coated with a composition of this invention. The internal surfaces (walls, stirrer paddle and shaft, protuberances etc) were heated to a temperature of about 90° C. and coated with a solution containing 1.5 g hydroquinone and 1.5 g triethylenetetraamine in a solvent composed of 70 g of ethanol and 30 g of water. The coating was then heated at a temperature of about 90° C. for a period of 30 minutes followed by a rinse with cold water. The polymerization reactor was then charged in the normal fashion as described in Example 1.

On the completion of the reaction 1.4 g of build-up were removed. This was equivalent to 0.047% of the initial monomer charged to the reactor.

EXAMPLE 3

The reactor used in Example 1 and containing none of the coating composition used in the invention and having also been cleaned was heated to a temperature of about 90° C. Two solutions were prepared: Solution (1)

consisted of 0.4 g tetraethylenepentamine, 0.25 g p-phenylenediamine, and 0.7 g p-aminobenzoic acid dissolved in 75 g of ethanol. Solution (2) consisted of 2.0 g salicylaldehyde, 0.5 g pyrogallol, and 2 g hydroquinone dissolved in 45 g of a 1:1 ethanol/water mixture. Solutions (1) and (2) were mixed and the resultant mixture was immediately sprayed on the internal surfaces of the reactor. The coating was baked for 30 minutes at a temperature which was approximately 90° C. and the coated surfaces were then cooled and rinsed with cold water.

The reactor was then charged with 3600 mls of demineralized water, 1.8 g di(tertiarybutylcyclohexyl) peroxydicarbonate, 0.13 g 2,2'-azobis-(2,4-dimethylvaleronitrile), 1.6 g polyvinyl alcohol (partially hydrolyzed polyvinyl acetate) and 2.5 g diallyl phthalate. The contents of the reactor were stirred and air was pumped out of the reactor. Vinyl chloride monomer (2500 g) was added, the reactor contents were heated to a temperature of 56° C. and polymerization of the monomer was effected as described in Example 1.

After the polymerization was completed the internal surfaces of the reactor were inspected and found to be clean and virtually free from build up.

EXAMPLE 4

Two solutions were prepared with the following compositions:
(1) Water 50 g
Ethanol 50 g
Tetraethylenepentamine 2.4 g
p-Phenylenediamine 3.6 g
(2) Water 50 g
Ethanol 50 g
Pyrogallol 2.4 g
Hydroquinone 3.6 g The two solutions were mixed and allowed to stand at ambient temperature for 40 minutes at which time a deep brown colour formed. The reactor used in Example 1 was carefully and thoroughly cleaned and heated to about 50°–70° C. The solution prepared above was brushed onto all the internal surfaces to give an even brown coating. The reactor was heated to about 80°–90° C. for 30 minutes and the coated surfaces were then rinsed with cold water. Following this rinse the coating had the appearance of a thin grey-brown film.

A polymerization reaction was then carried out in the reactor as described in Example 1. Following the removal of the polyvinylchloride the reactor was rinsed with water and three further batches of polyvinylchloride were prepared in the same manner. The coating on the internal surfaces was not modified or added to in any way.

After the fourth polymerization batch the internal surfaces of the reactor were carefully inspected. The internal surfaces of the walls of the reactor were dark and stained but completely free of build-up. The internal surface of the lid was similarly stained and about one quarter of the surface area was covered by a thin film of build-up with a slight crust formed around the central stirrer gland. The stirrer shaft was free from build-up with some build-up film on the paddle. The total weight of build-up subsequently removed by cleaning was 7 g, which was 0.06% of the total monomer charged.

EXAMPLE 5

Two solutions were prepared with the following compositions:

(1) Water 50 g
p-Phenylenediamine 2 g
(2) Water 50 g
Hydroquinone 2 g

The two solutions were mixed and air bubbled through the mixture for 40 minutes. A salmon pink precipitate formed at the initial mixing and gradually darkened during the period. The precipitate was removed by filtration and stored as a damp "mud".

Two grams of this "mud" were dissolved in 50 g of a solution prepared from water (40 g) ethanol (50 g), and 10% aqueous sodium hydroxide solution (10 g). This dark brown solution was used to coat the cleaned and cold internal surfaces of the reactor used in Example 1. The excess solution was removed by a water rinse leaving a very thin golden film covering all the internal surfaces of the reactor.

Four consecutive polymerization batches were carried out as described in Example 4 and the internal surfaces were carefully inspected. The surfaces were clean and shiny apart from some thin film build-up on the lid and paddle, and an accumulation around the stirrer shaft where it was above the surface of the liquid. The total weight of build-up removed by subsequent cleaning was 8 g, which was 0.07% of the total monomer charged.

EXAMPLE 6

Napthoquinone (0.5 g) and triethylenetetramine (0.35 g) were dissolved in that order in ethanol (50 g) and the solution painted onto the cleaned and heated (70° C.) internal surfaces of the reactor used in Example 1. The reactor was heated at about 80°–90° C. for 30 minutes and then rinsed with cold water.

After polymerising 3000 g of vinyl chloride in the reactor as described in Example 1 the internal surfaces were inspected and cleaned. The internal surfaces of the walls and lid were clean and shiny while the shaft had a moderate coating of build-up.

EXAMPLE 7

The procedure of Example 3 was repeated except that solutions (1) and (2) made up as follows:
Solution (1)
Tetraethylenepentamine 0.4 g
p-Phenylenediamine 0.5 g
p-Aminobenzoic acid 0.2 g
Water 52.5 g
Ethanol 0.5 g
Solution (2)
Salicylaldehyde 0.2 g
Pyrogallol 0.3 g
Hydroquinone 0.5 g
Water 45 g The internal surfaces were inspected after the polymerization reaction was complete. The walls were clean and shiny and the lid and paddle were partly covered with a thin film of build-up. The weight of build-up was 8.2 g representing 0.33% of the weight of monomer charged.

I claim:
1. A process for the polymerization of vinyl halide monomers in aqueous dispersion wherein polymerization is carried out in a reactor having deposited on the interior surfaces thereof a coating composition comprising a product formed by reacting at a temperature below 110° C. at least one aliphatic amine compound chosen from the group consisting of monoalkylamines, dialkylamines and polyamino aliphatic amines with at least one aromatic amine compound selected from the group consisting of primary and secondary aromatic amines and polyamino aromatic amines and with at least one oxy-group substituted aromatic compound chosen from the group consisting of hydroquinone, phenol, meta and para substituted phenols, cresols, p-tertiary-butylcatechol, picric acid, pyrogallol, salicylaldehyde, resorcinol, benzoquinone, substituted benzoquinone and napthoquinone, the ratio of any one compound chosen to the total weight of compounds chosen being in the range of 1:100 to 3:4.

2. A process according to claim 1 wherein the temperature is ambient.

3. A process according to claim 1 wherein the said aromatic amines are p-toluidine, p-aminobenzoic acid, phenthiazine, diphenylamine, p-phenylenediamine, and the said aliphatic amines are triethylenetetramine and tetraethylenepentamine.

4. A process according to claim 1 wherein the said aliphatic amines are triethylenetetramine and tetraethylenepentamine, and the said aromatic amines are p-phenylenediamine, p-aminobenzoic acid, the said oxy-group substituted aromatic, salicylaldehyde, pyrogallol, and napthoquinone.

5. A process according to claim 1 wherein at least two compounds are chosen from the group consisting of oxy-group substituted aromatic compounds and quinone type compounds.

6. A process according to claim 1 wherein the aromatic amine is p-phenylenediamine and the aliphatic amine is tetraethylenepentamine.

7. A process according to claim 1 wherein the oxy-group substituted aromatic compounds are hydroquinone, and pyrogallol.

8. A process according to claim 1 wherein the compounds chosen are p-phenylenediamine, tetraethylenepentamine, hydroquinone, and pyrogallol.

9. A process according to claim 1 wherein the compounds chosen are p-phenylenediamine, tetraethylenepentamine, p-aminobenzoic acid, hydroquinone, pyrogallol, and salicylaldehyde.

10. A process according to claim 1 wherein the reaction is carried out in the presence of oxygen or an oxidizing agent.

11. A process according to claim 10 wherein the oxygen is derived from air.

12. A process according to claim 1 wherein the said reaction is carried out in the presence of an inorganic alkali.

13. A process according to claim 12 wherein the inorganic alkali is selected from the group consisting of alkali metal carbonates, and alkali metal and ammonium hydroxides.

14. A process according to claim 13 wherein the inorganic alkali is selected from sodium and potassium hydroxide.

15. A process according to claim 1 wherein the coating composition is applied to the internal surfaces of the reactor in a dispersion or solution in a liquid carrier medium which is allowed or caused to evaporate so as to leave an adherent coating.

16. A process according to claim 1 wherein the coating composition is dissolved in an aqueous solution containing an inorganic alkali and the resulting solution applied to the internal surfaces of the reactor at ambient temperature.

17. A process according to claim 16 wherein the inorganic alkali is selected from sodium and potassium hydroxide.

18. A process according to claim 1 wherein the vinyl halide monomer polymerized is vinyl chloride.

19. A reactor coated with the coating composition of claim 1.

* * * * *